Jan. 22, 1935.   A. E. SCHEUERMAN   1,988,574
METHOD AND APPARATUS FOR MAKING HOLLOW GLASS ARTICLES
Filed Oct. 26, 1931   2 Sheets-Sheet 2
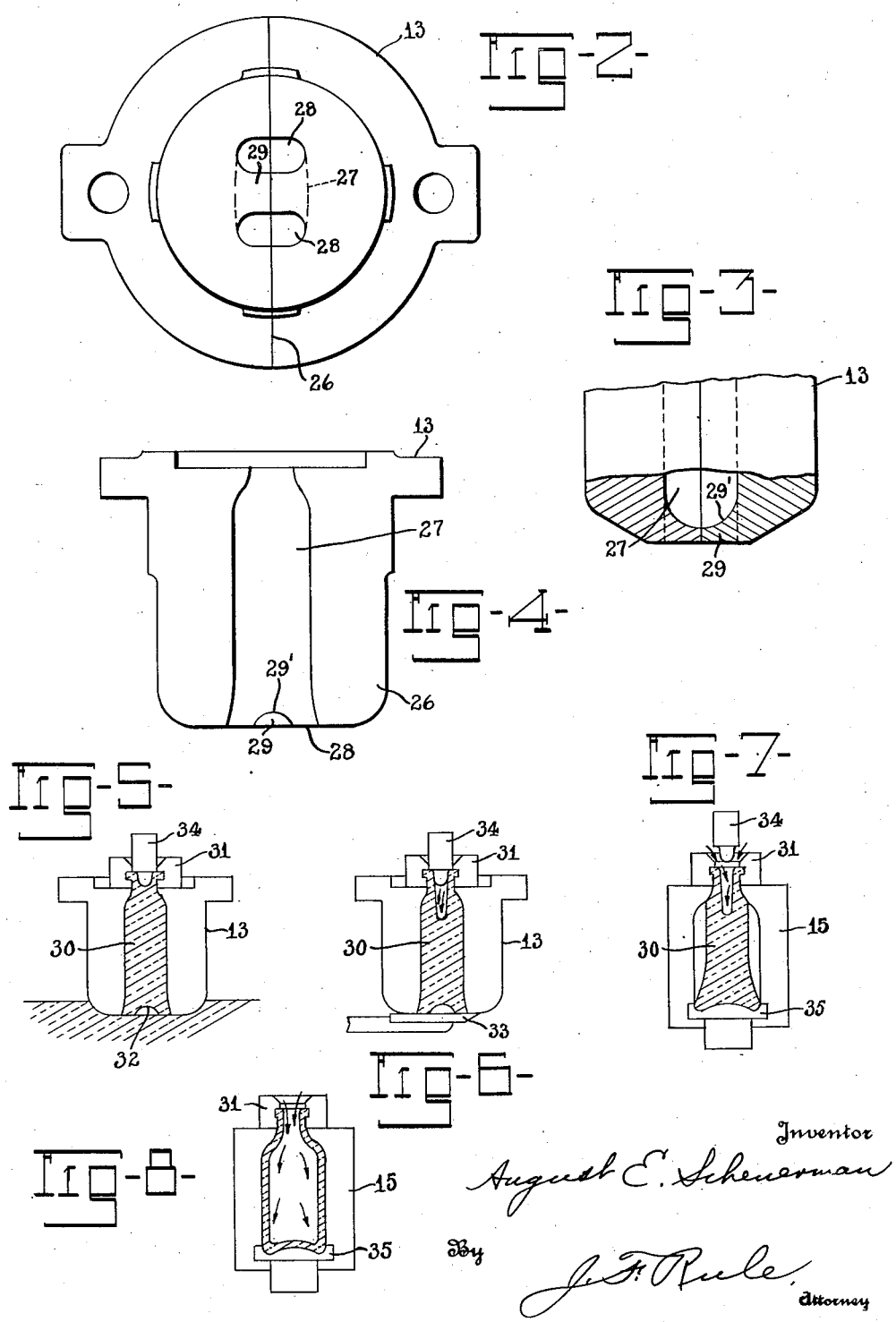

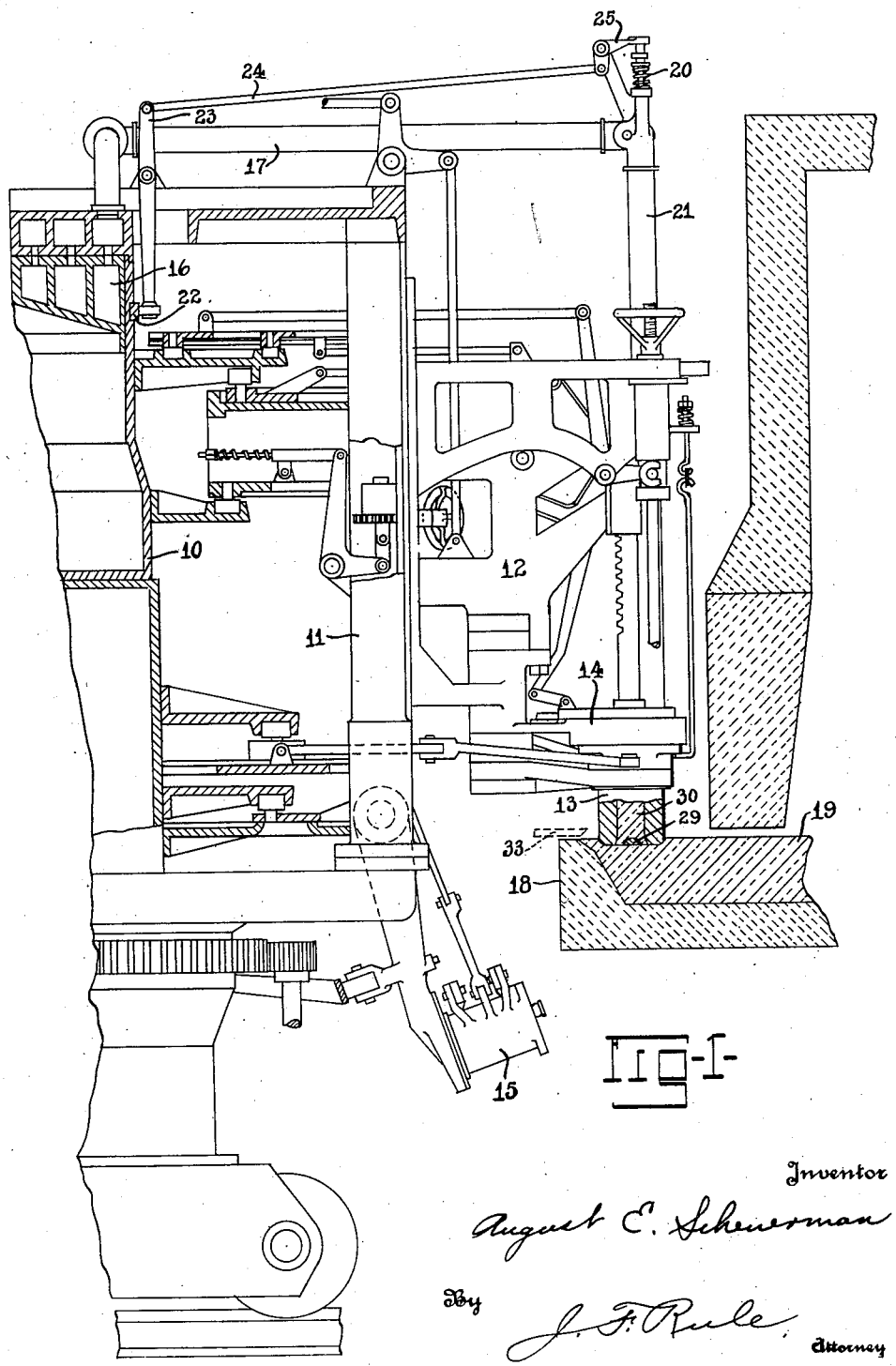

Patented Jan. 22, 1935

1,988,574

UNITED STATES PATENT OFFICE 1,988,574

METHOD AND APPARATUS FOR MAKING HOLLOW GLASS ARTICLES

August E. Scheuerman, Alton, Ill., assignor to Owens-Illinois Glass Company, a corporation of Ohio Application October 26, 1931, Serial No. 571,010

18 Claims. (Cl. 49—5)

The present invention relates to the manufacture of hollow glassware such as bottles and similar articles which are formed in molds. It is customary in making such articles to introduce a charge of glass by suction or otherwise into a preliminary forming mold and molding it therein to form a parison approximating more or less closely the shape of the finished article to be produced therefrom. The parison thus formed is transferred to a finishing mold and the article then blown to its final form.

Difficulty is sometimes experienced in obtaining an even distribution of the glass in the bottom portion of the finishing mold, and particularly is this true in the manufacture of articles of non-circular or irregular form such as flasks, panel bottles and the like. Frequently the bottoms of such articles are excessively thick at their central portions, forming an interior hump on said bottoms, while the edges or corner portions are excessively thin, resulting in weak and defective ware.

An object of the present invention is to provide means for overcoming this difficulty. The invention in the form shown comprises the use of a novel form of blank mold, in which the glass is introduced by suction through the lower open end thereof. In place of the usual single bottom opening in the mold, I provide a plurality of openings into the mold cavity, which may be separated by a bridge extending across the central bottom portion of the mold cavity. The parison when formed in a mold of this character and then blown in a finishing mold, results in a uniform distribution of the glass forming the bottom part of the article. In this manner, the usual hump or enlargement forming the central part of said bottom is eliminated and the corner portions of the article are blown to the desired thickness.

Other objects of the invention will appear hereinafter.

In the accompanying drawings:

Fig. 1 is a fragmentary sectional elevation of an Owens type suction gathering machine to which the present invention is applied.

Fig. 2 is a bottom plan view of the blank mold.

Fig. 3 is a part sectional elevation of the lower portion of the blank mold.

Fig. 4 is an elevation of a blank mold section, looking at the inner face thereof.

Figs. 5 to 8 are diagrammatic views showing successive steps in the formation of an article in the molds. Fig. 5 shows the blank mold in gathering position with a charge of glass drawn thereinto. Fig. 6 shows the mold after the glass has been severed and the parison blown in the blank mold. Fig. 7 shows the parison transferred to the finishing mold. Fig. 8 shows the parison blown to its final form within the finishing mold.

Referring to Fig. 1, a suction gathering machine of standard type is shown comprising a central stationary column 10, a mold carriage 11 mounted to rotate about said column, a dip frame 12 mounted for up and down movement on the carriage, a blank mold 13, a head 14 through which air and vacuum are supplied to the mold, and a finishing mold 15. A vacuum chamber 16 has communication through a vacuum line including pipes 17 and 21, with the head 14. The mold 13 is periodically brought over a tank 18 containing a supply body 19 of molten glass and lowered to a charge gathering position in contact with the glass. When in this position, suction is applied and a charge of glass drawn into the mold. The application of suction is controlled in the usual manner by a valve within the head 14, said valve having a stem 20 extending upward through the vacuum pipe 21. The valve stem 20 is lowered to open the valve by means of a cam 22 operating through connections including a lever 23, link 24 and bell crank 25. The parts above referred to, except the blank mold, are of standard construction and operate in the usual well known manner.

Referring to Figs. 2, 3 and 4, the body blank mold 13 comprises horizontally separable sections having inner faces 26 meeting in a vertical plane. Each section is formed with a mold cavity 27 extending vertically from the top to the bottom of the mold. In the form of mold shown, this cavity is approximately rectangular in cross section and of greater width than thickness, so that the parison formed therein is of suitable shape to be blown in a finishing mold designed to produce a flask, panel bottle or other article of similar shape.

In accordance with the present invention, the blank mold is provided with a plurality of bottom openings 28 instead of the usual single opening into the mold cavity. These separate openings are provided by forming each mold section with a lug or projection 29 located centrally of the bottom end of the mold cavity and extending to the plane of the inner mold face 26. When the mold sections are brought together the faces of the two lugs 29 abut, thereby forming a bridge which extends across the lower end of the mold cavity 27, the openings 28 being on opposite sides of said bridge. In other words, the two openings are at the lower corners of the mold cavity. As shown, these openings 28 are oblong and extend entirely across the mold cavity 27. An end view of the lug as shown in Fig. 4 presents a convex upper surface 29'. Viewed at right angles to Fig. 4, the bridge formed by the lugs 29 has a concave top surface or outline, as indicated in Fig. 3, which shows a longitudinal section of the bridge through the center thereof.

When the blank mold is brought into sealing contact with the supply body 19 of molten glass, and the air is exhausted from the mold, a charge of glass 30 is drawn into the combined body blank mold 13 and neck mold 31. The glass enters the mold in separate streams which flow through the openings 28 concomitantly and immediately merge into a single stream or column which advances upwardly to fill the mold cavity. The parison is formed with a concave bottom 32 owing to the displacement of the glass by the bridge 29. After the glass is introduced and the mold lifted from the supply body, a knife 33 shears across the bottom of the mold in the usual manner to sever the glass. While the knife is in position to form a closure for the bottom of the mold, air under pressure is supplied through the neck mold as usual to the initial blow opening formed by a plunger 34, thereby compacting the glass in the mold. The body blank mold sections are then separated, leaving the parison suspended from the neck mold. A mold bottom 35 is then brought into position beneath the parison and the finishing mold 15 is closed around the parison as shown in Fig. 7. The parison is then blown in the finishing mold to its final form (Fig. 8).

Modifications may be resorted to within the spirit and scope of my invention.

What I claim is:

1. A glass mold having a mold cavity extending to one end of the mold, and a bridge extending across the mold cavity at said ends and providing separate openings through said end to the mold cavity, said bridge formed with a convex inner surface and an outer surface flush with the end of the mold, said surfaces each extending from one to the other of said openings, the ridge of said inner surface extending lengthwise of the bridge from one mold wall to the other being concave in outline.

2. In a machine for forming glass articles, the combination of a mold open at one end to receive a charge of glass, a bridge extending across the cavity at said end, and a knife operable to shear across said end of the mold and form a temporary closure for said open end, said bridge having its exterior surface in the plane of said end of the mold.

3. A mold comprising separable sections and providing a mold cavity open at one end of the mold when said sections are together, projections extending from the inner surfaces of said cavity and forming a bridge extending across the mold cavity, said projections being at said end of the mold and having outer faces flush with said end, means for drawing glass from a supply body into the mold cavity, and a knife operable to shear across said end.

4. A mold comprising separable sections having their faces meeting in a vertical plane, said sections formed to provide a mold cavity extending vertically through the mold, a bridge having fixed relation to the mold and extending across the lower open end of the mold with the outer face of the bridge flush with said end of the mold, and a closure plate movable into position to abut said bridge and close said end of the mold.

5. A mold comprising separable sections having their faces meeting in a vertical plane, said sections formed to provide a mold cavity extending vertically through the mold, a bridge extending across the lower open end of the mold with the outer face of the bridge flush with said end of the mold, and a closure plate movable into position to abut said bridge and close said end of the mold, said bridge comprising lugs projecting from the faces of the mold cavity and having their outer end surfaces in the plane of said meeting faces of the mold.

6. The combination of a suction gathering mold open at one end to receive a charge of glass, means for introducing glass by suction through said end of the mold, a mold closing device cooperating with the mold to close said open end, and means carried by the mold and cooperating with said closing device to provide a convex bottom by which a concave bottom surface is formed on the parison of glass in the mold.

7. The combination of a blank mold open at one end to receive a charge of glass, means for bringing said end of the mold into contact with a supply body of molten glass, means for exhausting the air from the mold to fill the mold cavity with glass, a knife operable to sever the glass at said open end of the mold, and means carried by the mold and cooperating with the knife to form an upwardly convex bottom for the mold opening by which a concave surface is formed on the bottom of the parison of glass within the mold.

8. The combination of a blank mold open at one end to receive a charge of glass, means for bringing said end of the mold into contact with a supply body of molten glass, means for exhausting the air from the mold to fill the mold cavity with glass, a knife, means for shearing the knife across said open end of the mold to sever the glass and bring the knife to position to close said end, and means supported independently of the knife and cooperating with the knife to form an upwardly convex bottom for the mold opening by which a concave surface is formed on the bottom of the parison of glass within the mold.

9. The combination of a mold formed with a mold cavity having an opening through one end of the mold, means for transferring molten glass from a supply body into the mold cavity by suction through said open end, means for giving an end surface portion of the parison of glass at said end of the mold, a concave formation concurrently with the movement of the glass into the mold cavity, and means for severing the parison from the supply body of glass after the formation of said end surface portion.

10. The combination of a suction gathering mold open at one end thereof to receive a charge of glass, means for bringing said open end into sealing contact with a supply body of molten glass, means for introducing a charge of glass by suction through said open end into the mold, and means providing an incomplete bottom for said open end, said bottom being in position during the introduction of the glass into the mold for shaping an end portion of the glass within the mold.

11. In a machine for forming glass articles, the combination of a blank mold, a mold bottom part having an interior convex surface, and means for introducing molten glass by suction into the mold through its bottom end and causing said bottom part to form a concave bottom surface on the parison of glass as the glass enters the mold.

12. In a machine for forming glass articles, the combination of a vertically disposed mold open at its lower end, means for bringing said end into sealing contact with a supply body of molten glass and introducing a charge of glass into the mold, means for forming a concave bottom surface on the parison of glass while the mold is in said sealing contact with the supply body, and means for severing the glass.

13. The method of forming a parison of glass which comprises introducing molten glass into an elongated mold cavity at one end thereof in sufficient volume to fill the mold cavity, and giving a concave surface formation to the end of the parison at said end of the mold cavity concurrently with the introduction of glass into the mold cavity.

14. A machine for forming glass articles comprising, in combination, a blank mold, means for introducing a charge of molten glass by suction into the mold through one end thereof, means cooperating with the charge receiving end of the mold to form a concave bottom surface area on the parison in the mold during the entry of the glass into the mold, a finishing mold, means for transferring the parison to the finishing mold, and means for blowing the parison in the finishing mold.

15. The combination of a suction gathering mold open at one end to receive a charge of glass, means for introducing glass by suction through said end of the mold, a mold closing device movable relative to the mold into position to close said open end, and means carried by the mold and brought into superposed relation to said closing device when the latter is in mold closing position and cooperating with said closing device to provide a convex bottom by which a concave bottom surface is formed on the glass in the mold.

16. A mold having a mold cavity extending lengthwise thereof from one end of the mold, a bridge located within the mold cavity and forming a fixed part of the mold, said bridge extending across said end of the mold with its outer face flush with said end, said bridge being formed to provide separate spaced orifices opening into the mold cavity at said end, and a mold closing device movable into a closing position in which it closes said orifices at the end of the mold and in which closing position its inner surface is substantially flush with said end of the mold and forms a portion of the end wall for the mold cavity.

17. In a machine for forming glass articles, a mold having a cavity extending lengthwise thereof and opening through both ends of the mold, a bridge located within and extending across the mold cavity at one end of the mold with the outer face of the bridge flush with the end of the mold, and a mold closing plate movable across the mold into position to close said last mentioned end and form an end wall of the mold cavity, said end wall being substantially flush with the end of the mold when the plate is in said closing position.

18. A glass mold having a mold cavity extending to one end of the mold, and a bridge located within and extending across the mold cavity at said end and providing separate openings through said end to the mold cavity, said bridge formed with a convex inner surface within the mold cavity and an outer surface flush with the end of the mold, said surfaces each extending from one to the other of said openings.

AUGUST E. SCHEUERMAN.